United States Patent
Chung et al.

(10) Patent No.: US 7,353,250 B2
(45) Date of Patent: Apr. 1, 2008

(54) REPRODUCING APPARATUS AND SERVER SYSTEM PROVIDING ADDITIONAL INFORMATION THEREFOR

(75) Inventors: Hyun-kwon Chung, Gyeonggi-do (KR); Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 10/995,295

(22) Filed: Nov. 24, 2004

(65) Prior Publication Data

US 2005/0071425 A1 Mar. 31, 2005

Related U.S. Application Data

(63) Continuation of application No. 09/903,630, filed on Jul. 13, 2001.

(30) Foreign Application Priority Data

Mar. 10, 2001 (KR) ................. 2001-12444

(51) Int. Cl.
*G06F 15/16* (2006.01)
(52) U.S. Cl. ............ 709/203; 709/217; 709/219
(58) Field of Classification Search ........ 709/217–219, 709/203; 705/58; 707/204; 713/184
See application file for complete search history.

(56) References Cited

U.S. PATENT DOCUMENTS 5,701,343 A * 12/1997 Takashima et al. .......... 705/51
5,764,896 A * 6/1998 Johnson ...................... 709/250
5,774,670 A * 6/1998 Montulli ..................... 709/227
6,202,056 B1 * 3/2001 Nuttall .......................... 705/52
6,345,256 B1 * 2/2002 Milsted et al. ................. 705/1
6,389,538 B1 * 5/2002 Gruse et al. ................. 713/194
6,418,421 B1 * 7/2002 Hurtado et al. .............. 705/54
6,449,226 B1 * 9/2002 Kumagai ................... 369/47.1
6,505,160 B1 * 1/2003 Levy et al. ................. 704/270
6,587,127 B1 * 7/2003 Leeke et al. ................ 715/765

(Continued)

FOREIGN PATENT DOCUMENTS

JP           7-296508          11/1995

(Continued)

OTHER PUBLICATIONS

Lin, Daniel et al. "Taking the Byte Out of Cookies : Privacy, Consent, and the Web". ACM Policy Proceedings of the ethics and social impact component on Shaping Policy in the Information Age. ACM Press. Washington, D.C. 1998. pp. 39-51.*

(Continued)

*Primary Examiner*—Jason D Cardone
*Assistant Examiner*—Jeffrey R Swearingen
(74) *Attorney, Agent, or Firm*—Stein, McEwen & Bui, LLP

(57) ABSTRACT

A reproduction apparatus and a server system to provide additional information, the reproduction apparatus includes an identifier generator to generate the identifier of the contents, a network connector, and a controller to transmit the identifier generated by the identifier generator to a server system providing the additional information through the network connector, and to receive the additional information provided from the server system through the network connector.

13 Claims, 4 Drawing Sheets

U.S. PATENT DOCUMENTS

| | | |
|---|---|---|
| 6,751,654 B2 | 6/2004 | Massarani et al. |
| 6,829,368 B2 * | 12/2004 | Meyer et al. ............... 382/100 |
| 2002/0052933 A1 * | 5/2002 | Leonhard et al. ........... 709/219 |

FOREIGN PATENT DOCUMENTS

| | | |
|---|---|---|
| JP | 8-153331 | 6/1996 |
| JP | 8-160855 | 6/1996 |
| JP | 9-214923 | 8/1997 |
| JP | 10-21263 | 1/1998 |
| JP | 10-116472 | 5/1998 |
| JP | 10-177767 | 6/1998 |
| JP | 11-260045 | 9/1999 |
| JP | 11-271071 | 10/1999 |
| JP | 11-296587 | 10/1999 |
| JP | 11-341440 | 12/1999 |
| JP | 2000-311135 | 11/2000 |
| JP | 2001-014250 | 1/2001 |
| JP | 2001-42866 | 2/2001 |
| JP | 2001-051839 | 2/2001 |
| JP | 2001-202312 | 7/2001 |
| KR | 2000-71986 | 12/2000 |
| WO | 98/03923 | 6/1997 |
| WO | 99/55055 | 4/1999 |
| WO | 00/65509 | 4/2000 |
| WO | 00-322353 | 8/2000 |
| WO | WO 00/45303 | 8/2000 |
| WO | 00/63903 | 10/2000 |
| WO | WO 01/08021 | 2/2001 |

OTHER PUBLICATIONS

Japanese Office Action dated Jan. 27, 2004 for corresponding Japanese Patent Application No. 2001-246689.
Japanese Office Action dated Jun. 1, 2004.
Office Action issued by Japanese Patent Office in Japanese Patent Application No. 2004-130109 on Feb. 6, 2007.

* cited by examiner

REPRODUCING APPARATUS AND SERVER SYSTEM PROVIDING ADDITIONAL INFORMATION THEREFOR

CROSS-REFERENCE TO RELATED APPLICATIONS

This application is a continuation of Ser. No. 09/903,630, filed on Jul. 13, 2001 in the United States Patent and Trademark Office, currently pending, which claims the benefit of Korean Application No. 2001-12444, filed Mar. 10, 2001, in the Korean Industrial Property Office, the disclosures of which are incorporated herein by reference.

BACKGROUND OF THE INVENTION

1. Field of the Invention

The present invention relates to a reproduction apparatus and a server system providing additional information, and more particularly, to a reproduction apparatus to read contents from storage media and to reproduce the read contents and a server system providing additional information that is connected to the reproduction apparatus through a network, a method of providing the additional information, and an information storage medium in which the additional information is recorded 2. Description of the Related Art Digital storage media such as CDS and DVDs, in which various contents such as audio and video information are recorded, are widely used. In particular, audio contents or video contents are recorded on CD-ROMs, DVD-audio, and DVD-videos, and the CD-ROMs, the DVD-audio, and the DVD-videos are then sold.

There are various additional information related to the audio contents or the video contents. For example, in the case of music videos, additional information could include the words of the songs, personal information items on the singers, contents of recent activities, and other hit songs of a similar genre. However, when a user desires to know such additional information, the user must access other media.

SUMMARY OF THE INVENTION

To solve the above and other problems, it is an object of the present invention to provide a server system that provides additional information on contents recorded on recording media such as CD-ROMs, DVD-audio, and DVD-videos through a network, a reproduction apparatus to reproduce the recording media and receive the additional information, a method of providing the additional information, and an information storage medium in which the additional information is recorded.

It is another object of the present invention to provide a server system providing additional information that provides and receives a most recent of the additional information on the contents recorded in the recording media such as the CD-ROMs, the DVD-audio, and DVD-videos through a network, and a reproduction apparatus therefor, a method of providing the additional information, and an information storage medium in which the additional information is recorded.

Additional objects and advantages of the invention will be set forth in part in the description which follows and, in part, will be obvious from the description, or may be learned by practice of the invention.

To achieve the above and other objects, a reproduction apparatus to reproduce contents according to an embodiment of the present invention that includes an identifier generator to generate the identifier of the contents, a network connector and a controller to transmit the identifier generated by the identifier generator to a server system providing additional information through the network connector and to receive the additional information provided from the server system providing the additional information through the network connector.

According to an aspect of the present invention, the reproduction apparatus includes a reading unit to read data from storage media, in which the contents are stored.

According to another aspect of the present invention, the identifier generator receives an International Standard Recording Code (ISRC) read from the storage media by the reading unit and provides the ISRC as the identifier to the controller.

According to a further aspect of the present invention, the controller includes a browser that transmits the identifier to a server installed in the additional information service server system, receives additional information provided from the server, and displays the additional information.

According to a yet further aspect of the present invention, the reproduction apparatus further comprises a reading unit to read the contents from the recording media on which the contents are stored and a reproducer to reproduce contents read by the reading unit.

According to a still further aspect of the present invention, the reproducer further includes a decoder to decode read contents, a speaker to receive audio data output from the decoder and to deliver sound, and a display apparatus to receive video data output from the decoder and to display images.

According to another embodiment of the present invention, a server system that includes an additional information database to store additional information corresponding to a plurality of contents, and a server to receive an identifier with respect to predetermined contents from a reproduction apparatus that reproduces the contents, to receive the additional information corresponding to the identifier from the additional information data base, and to transmit the additional information to the reproduction apparatus.

According to an aspect of the present invention, the contents include an International Standard Recording Code (ISRC) and, the server receives the ISRC as the identifier, receives additional information mapped to the ISRC from the additional information data base, and transmits the additional information to the reproduction apparatus.

According to another aspect of the present invention, the reproduction apparatus preferably includes an identifier generator to generate the identifier of the contents, a network connector, and a controller to transmit the identifier generated by the identifier generator to a server system providing additional information through the network connector, to receive the additional information provided from the additional information service server system through the network connector, and to display the additional information.

According to a yet further aspect of the present invention, the reproduction apparatus further includes a reading unit to read data from the storage media on which the contents are stored.

According to a still further aspect of the present invention, the identifier generator receives the ISRC read from the storage media and provides the ISRC to the controller.

According to an aspect of the present invention, a method of providing additional information includes providing a contents identifier to identify predetermined contents, transmitting, through a network connector, the provided contents identifier to a server system providing additional information related to the provided contents identifier; and receiving, through the network connector, the additional information provided from the server system.

According to an aspect of the present invention, the providing the contents identifier includes reading the contents identifier from a recording medium storing the predetermined contents.

According to an aspect of the present invention, the providing the contents identifier includes reading an International Standard Recording Code (ISRC) as the contents identifier from a recording medium storing the predetermined contents.

According to an aspect of the present invention, a method of providing additional information includes transmitting a Cookie file to a server system providing additional information, the Cookie file including a contents identifier which identifies predetermined contents; and receiving the additional information related to the transmitted contents identifier from the server system through a network connector.

According to an aspect of the present invention, the transmitting the contents identifier includes reading the contents identifier from a recording medium storing the predetermined contents.

According to an aspect of the present invention, the transmitting the contents identifier includes reading an International Standard Recording Code (ISRC) as a Cookie file from a recording medium storing the predetermined contents.

According to an aspect of the present invention, a method of providing additional information includes receiving a contents identifier that identifies predetermined contents, the contents identifier being transmitted from a reproduction apparatus; extracting additional information corresponding to the received contents identifier; and transmitting the extracted additional information to the reproduction apparatus.

According to an aspect of the present invention, the receiving the contents identifier includes receiving the contents identifier read from the recording medium storing the predetermined contents.

According to an aspect of the present invention, the receiving the contents identifier includes receiving an International Standard Recording Code (ISRC) as the contents identifier.

According to an aspect of the present invention, the receiving the contents identifier includes receiving the contents identifier in a Cookie file.

BRIEF DESCRIPTION OF THE DRAWINGS

The above and other objects and advantages of the present invention will become more apparent and more readily appreciated by describing in detail preferred embodiments thereof with reference to the attached drawings in which.

DETAILED DESCRIPTION OF THE PREFERRED EMBODIMENTS

Figure 1:
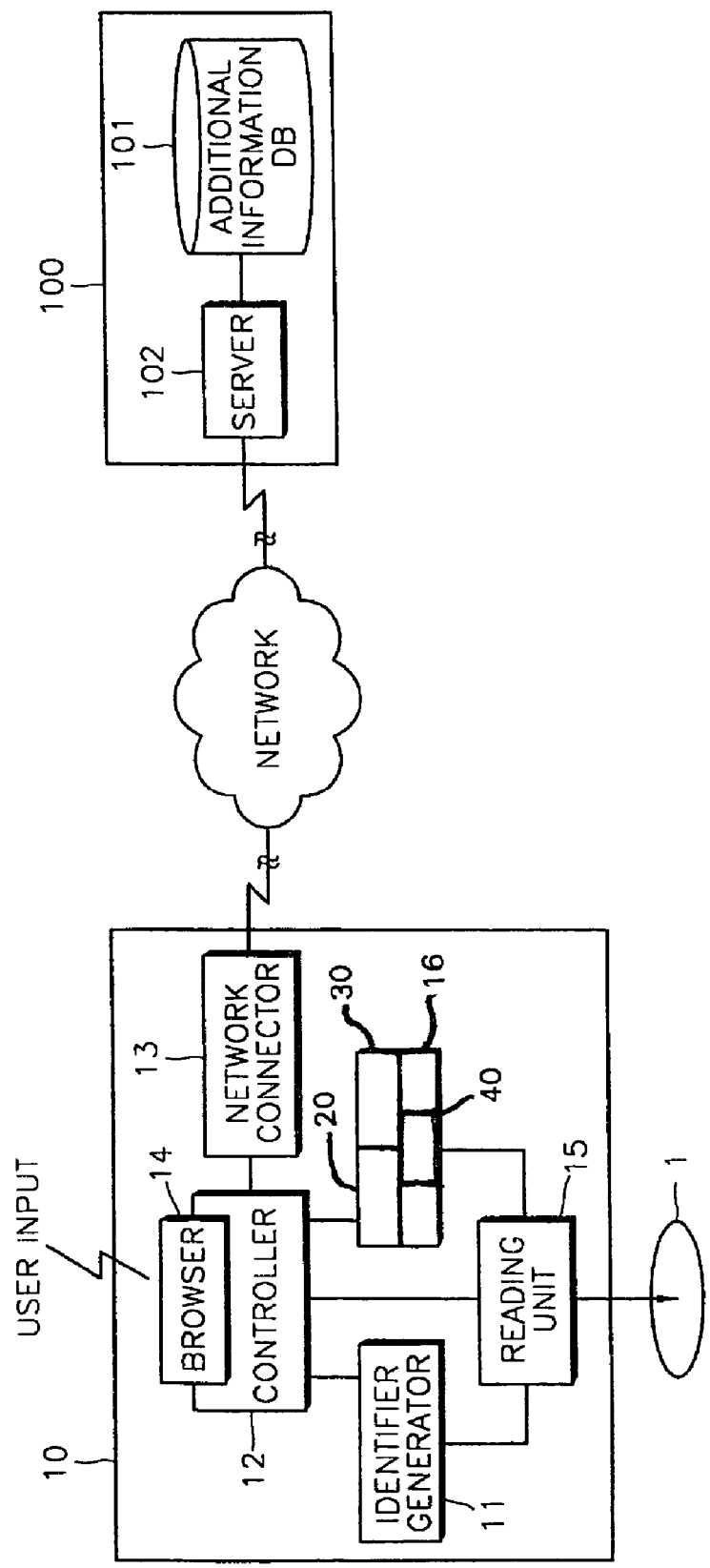
FIG. 1 schematically shows a reproduction apparatus and a server system providing additional information therefor according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 schematically shows a reproduction apparatus and a server system providing additional information therefor according to an embodiment of the present invention. One or more contents #1, #2, . . . , and #N and an international standard recording code (ISRC) given to the contents are recorded on an optical disc 1, which is a recording medium/ storage medium according to the present embodiment. The International Standard Recording Code (ISRC) code is an international standard code used for distinguishing music, songs, music videos and is given by the Recording Industry Association of America (RIM). The ISRC includes a country code (2 characters), a copyright holder code (3 characters), a year of recording code (2 characters), and a recording number code (5 characters). The ISRC can be specific to each of the contents (i.e., to each track) or to all of the contents (i.e., a collection of tracks). However, the ISRC is not specific to the physical product and functions as an owner identification mechanism for the individual content or collection of contents. While the ISRC is disclosed as being the mechanism for indicating content ownership, it is understood that other mechanisms are available with regard to ownership of the contents.

A reproduction apparatus 10 includes an identifier generator 11, a controller 12, a network connector 13, a reading unit 15, and a reproducer 16. The identifier generator 11 generates an identifier with respect to the contents recorded in a storage medium/recording medium such as an optical disc 1. The identifier generated according to the present invention is the ISRC. The ISRC is read from the optical disc 1 by the reading unit 15 and is provided to the identifier generator 11. The network connector 13, which is a connection interface to be connected to the network, transmits predetermined information to the network or receives predetermined information from the network. A browser 14, which is used to search for information stored in a server system providing additional information 100, is installed in the controller 12. The browser 14 is a user interface to read a file online. The browser 14 according to the present invention is a web browser that transmits information to a server 102 installed in the server system 100, and receives information from the server 102 to be described more fully later. The web browser 14 is a client program using an Internet protocol, such as a hypertext transfer protocol (HTTP) and a file transfer protocol (FTP), in order to request material from a web server. It is understood that the network can be the Internet, a Large Area Network (LAN), a Wide Area Network (WAN), a Metropolitan Area Network (MAN), a public or private network of computers, a wireless network, or any interconnection of nodes by communication paths.

The reading unit 15 reads contents from the optical disc 1. The reproducer 16 reproduces the contents read by the reading unit 15. For this, the reproducer 16 can further include a decoder 40 to decode the read contents, a speaker 20 to receive audio data output from the decoder 40 and to deliver sound, and a display apparatus 30 to receive video data output from the decoder 40 and to display images. The speaker 20 and/or display apparatus 30 may not be included in the reproducer 16 and may be provided separately from the reproduction apparatus 10, if necessary.

The server system 100 includes an additional information database 101 and the server 102. In addition to the contents recorded in the optical disc 1, additional information on the various contents is stored in the additional information database 101 corresponding to the ISRC. Detailed description of additional information will be described later.

The server 102 receives the identifier on predetermined contents from the reproduction apparatus 10, extracts the additional information corresponding to the identifier from the additional information database 101, and transmits the additional information to the reproduction apparatus 10. The server 102, which is computer having a program encoded on a recordable medium to respond to requests from client programs such as the browser 14 in a client/server model, is a server program to provide web pages or files requested from the browser 14 when it accesses the web server 102 according to the present embodiment.

The server 102 transmits information to the browser 14 and receives information from the browser 14 through a "Cookie" file. The Cookie file is a text file stored in a client. In the present embodiment, the Cookie file is prepared by the browser 14 and is stored. The browser 14 stores the Cookie file, which includes the ISRC in a memory (not shown) included in the controller 12. The Cookie file is usually stored in the directory used by the browser 14. To be more specific, the browser 14 receives the identifier generated by the identifier generator 11 (i.e., the ISRC) and stores the ISRC in the Cookie file. The server 102 reads the Cookie file, identifies the ISRC, extracts the additional information corresponding to the ISRC from the additional information database 101, and transmits the extracted additional information to the reproduction apparatus 10. It is understood that the Cookie file can be a temporary file that is erased after the content is reproduced, or a more permanent file that reflects a record of contents previously reproduced.

Figure 2:
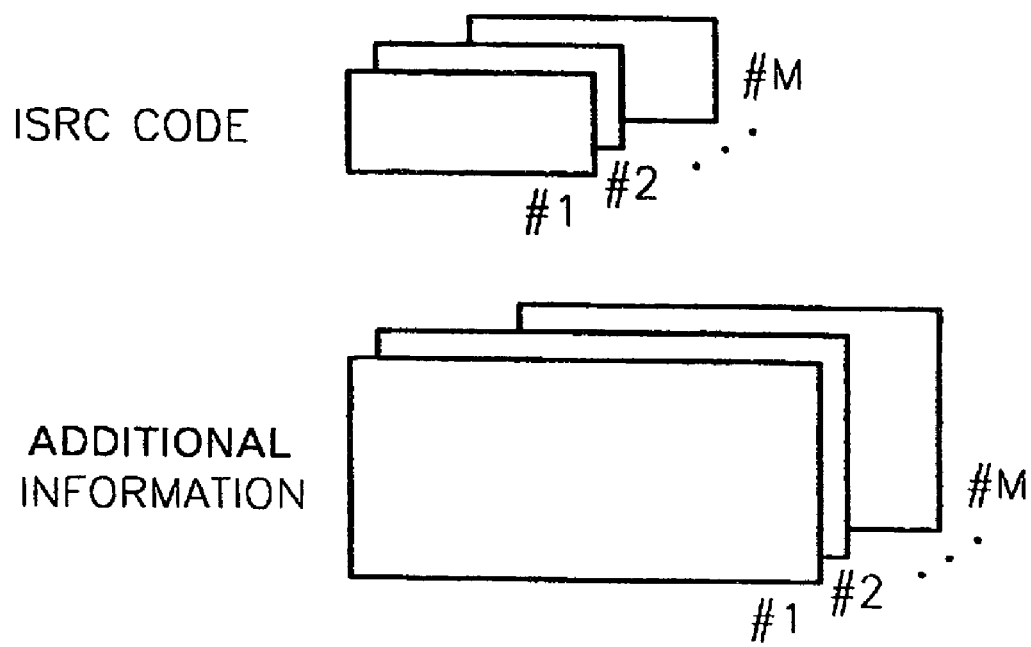
FIGS. 2 and 3 show the structure of data stored in an additional information database according to an embodiment of the present invention.

FIG. 2 shows the structure of data stored in the additional information database 101 according to the preferred embodiment of the present invention. Referring to FIG. 2, a plurality of ISRC and the additional information corresponding to the plurality of ISRC are stored in the additional information database 101. The additional information database 101 may be a relational database in the form of tables defined to access or reconstruct data by various methods. The additional information database 101 can be a distribution type database, in which data items are distributed in various points on a network, or an object-oriented data base, in which data defined by an object class and a sub class are consistent with each other.

Figure 3:
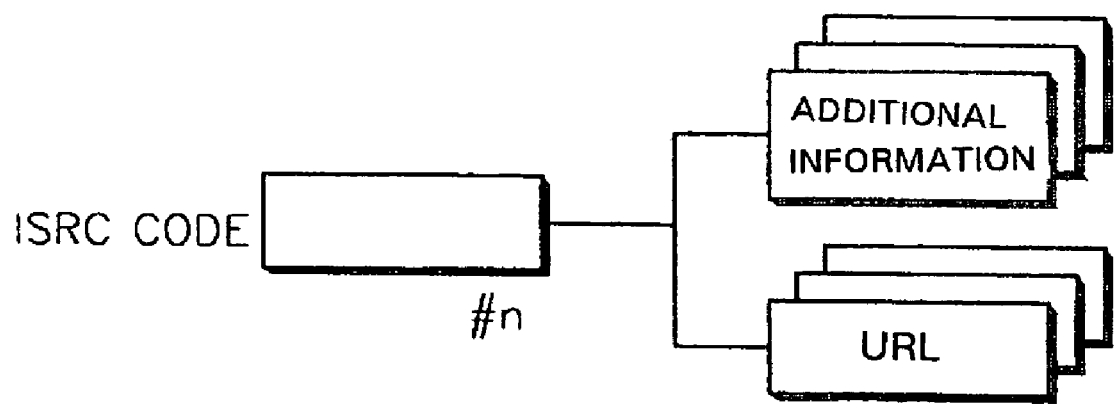

Referring to FIG. 3, the additional information is prepared to correspond to the ISRC and includes one or more uniform resource locators (URL) as a plurality of additional contents file and/or link information. The URL indicates the positions of resources, which can be accessed on the Internet. The URL consists of protocol names to access resources, domain names to distinguish specific computers on the Internet, and path names hierarchically to show the positions of files.

Processes of displaying additional information and a method of providing the additional information according to the present invention will now be described. It is generally understood that the controller 12 and/or the server 102 is a general or special purpose computer that implements the process of displaying the information items using computer software programs, which are stored on computer readable media.

Figure 4:
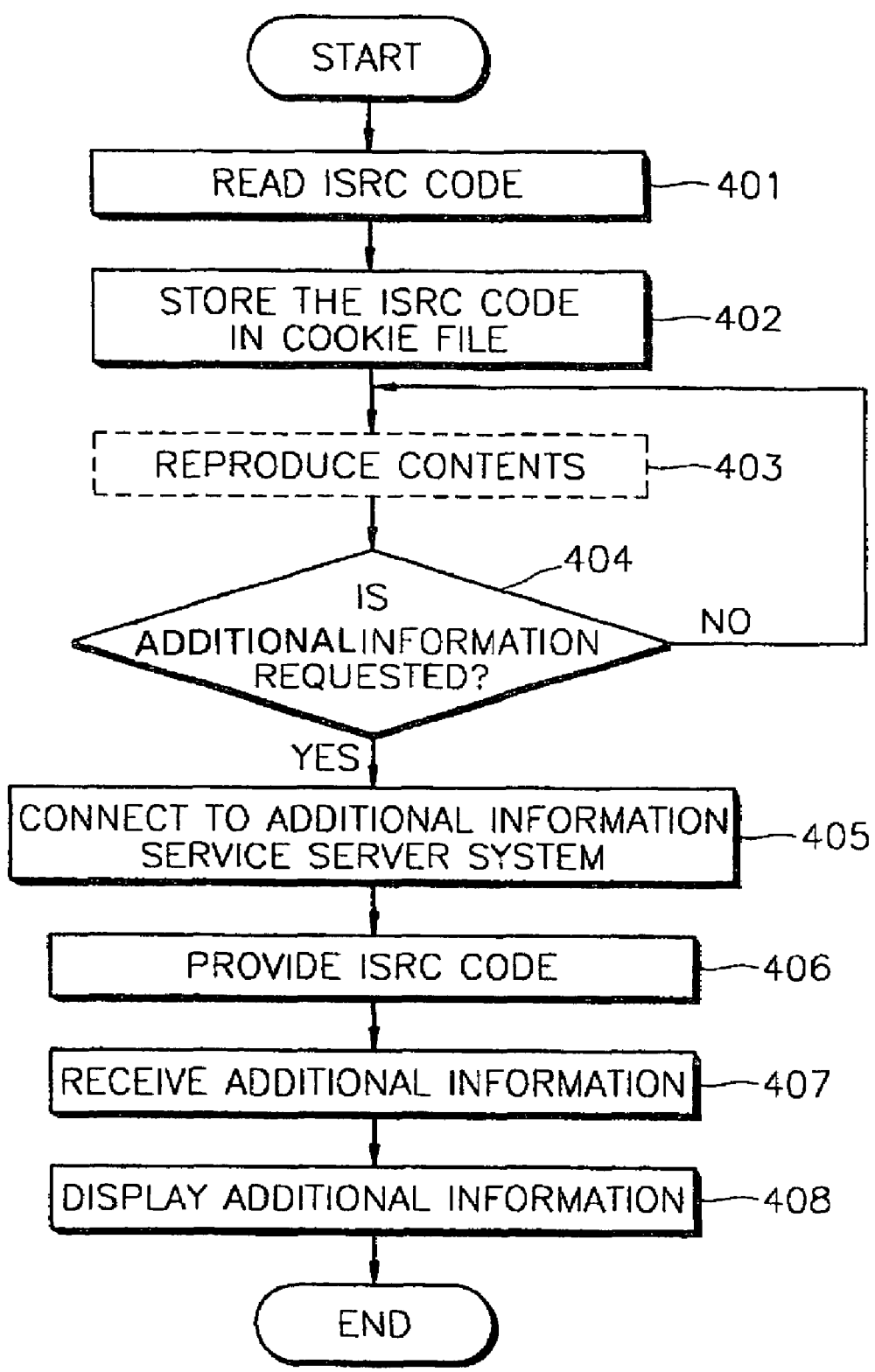
FIG. 4 is a flowchart of a process performed by a reproduction apparatus to display the additional information.

FIG. 4 is a flowchart showing the process performed by the reproduction apparatus 10 used to display the additional information. Referring to FIG. 4, when the optical disc 1 is inserted into the reproduction apparatus 10, the reading unit 15 reads the ISRC from the optical disc 10 and transmits the ISRC to the identifier generator 11 (operation 401). The identifier generator 11 transmits the ISRC to the controller 12, and the browser 14 stores the received ISRC in the Cookie file (operation 402). When a user input is received in the controller 12, the reading unit 15 reads corresponding contents and the reproducer 16 reproduces the read contents (operation 403). When the user input requesting the additional information is received in the controller 12 during the reproduction of the contents (operation 404), the browser 14 is called and connected to the server system 100 through the network connector 13 (operation 405).

The browser 14 provides the ISRC stored in the Cookie file to the server 102 of the server system 100 (operation 406). The browser 14 receives the additional information provided from the server 102 (operation 407), and displays the received additional information (operation 408).

It is understood that operation 403 can be omitted. Namely, the user can request additional information on specific contents when the contents are not being reproduced. In this case, when the user requests the additional information, the controller 12 (or the browser 14) displays menu screens with respect to all the contents recorded in the optical disc 1. The additional information is provided by the browser 14 providing the ISRC with respect to the selected contents to the server 102 when the user selects the specific contents.

Figure 5:
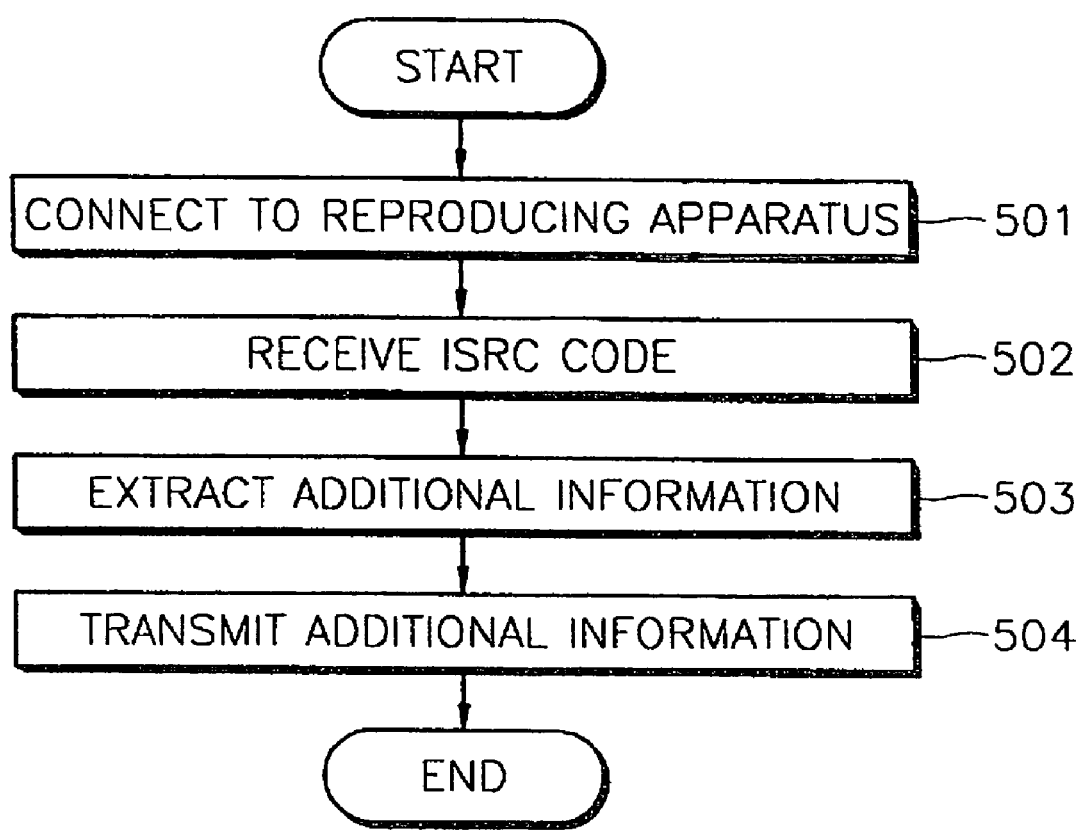
FIG. 5 is a flowchart of a process performed by a server system to provide the additional information.

FIG. 5 is a flowchart showing the process of the server system 100 used to provide the additional information. Referring to FIG. 5, the server 102 of the server system 100 is connected to the reproduction apparatus 10 through the network (operation 501). The server 102 requests the ISRC from the browser 14 installed in the reproduction apparatus 10 and receives the ISRC (operation 502). The server 102 extracts the additional information corresponding to the received ISRC from the additional information data base 101 on the basis of the received ISRC (operation 503) and transmits the extracted additional information to the browser 14 (operation 504).

In the above embodiment, the identifier generator 11 receives the ISRC read from the optical disc 1 by the reading unit 15. However, it is understood that the identifier generator 11 can be provided so as to receive header information of the contents recorded in the optical disc 1, and to generate a predetermined identifier on the basis of the header information. Also, it is understood that the additional information may be stored in the additional information database 101 to correspond to the new identifier generated from the header information.

As mentioned above, according to the present invention, a server system providing additional information, which is capable of providing and receiving the additional information on the respective contents through the network, and a reproduction apparatus therefor are provided. Accordingly, the user can receive the most recent additional information with respect to the specific contents.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing additional information comprising:
storing a Cookie file in an apparatus that is using predetermined contents read from a storage medium storing the predetermined contents and a contents identifier, the Cookie file including the contents identifier which identifies the predetermined contents,
transmitting the stored Cookie file from the apparatus to a server system providing additional information; and
receiving the additional information related to the transmitted contents identifier from the server system through a network connector.

2. The method of claim 1, wherein the storing the Cookie file comprises reading the contents identifier from a recording medium storing the predetermined contents, and storing the contents identifier in the Cookie file in the apparatus.

3. The method of claim 1, wherein the storing the Cookie file includes reading an International Standard Recording Code (ISRC) from a recording medium storing the predetermined contents, and storing the ISRC in the Cookie file in the apparatus.

4. A method of providing additional information comprising:
receiving a Cookie file including a contents identifier that identifies predetermined contents, the contents identifier being transmitted from a reproduction apparatus which retrieved the contents identifier from a recording medium storing the predetermined contents and the contents identifier and prepared and stored the contents identifier in the Cookie file prior to transmission;
extracting additional information related to the received contents identifier; and
transmitting the extracted additional information to the reproduction apparatus.

5. The method of claim 4, wherein the receiving the Cookie file includes receiving the contents identifier read from the recording medium storing the predetermined contents.

6. The method of claim 4, wherein the receiving the Cookie file includes receiving an International Standard Recording Code (ISRC) as the contents identifier.

7. The method of claim 4, wherein the receiving the Cookie file includes receiving the contents identifier in the Cookie file created by a browser of the reproduction apparatus and which stores the contents identifier.

8. The method of claim 1, wherein the predetermined contents comprises audio and/or video contents, and the additional information includes words of a song of the audio and/or video contents, personal information items on singers of the audio and/or video contents, contents of recent activities of the audio and/or video contents, other songs of a similar genre of the audio and/or video contents, or combinations thereof.

9. The method of claim 8, wherein the audio and/or video contents are retrieved from an information storage medium having the contents identifier, and the additional information are not stored on the information storage medium.

10. The method of claim 1, further comprising reproducing the received additional information without reproducing the corresponding predetermined contents.

11. The method of claim 1, further comprising reproducing the received additional information while reproducing the corresponding predetermined contents.

12. The method of claim 1, further comprising:
receiving an input at the apparatus requesting reproduction of the additional information,
if the received input requests reproduction of the additional information without reproducing the corresponding predetermined contents, the additional information which was received from the server system using the contents identifier is reproduced without reproducing the corresponding predetermined contents, and
if the received input requests reproduction of the additional information while reproducing the corresponding predetermined contents, the additional information was received from the server system using the contents identifier and reproduced while reproducing the corresponding predetermined contents.

13. The method of claim 4, wherein the contents comprises audio and/or video predetermined contents, and the additional information includes words of a song of the audio and/or video contents, personal information items on singers of the audio and/or video contents, contents of recent activities of the audio and/or video contents, other songs of a similar genre of the audio and/or video contents, or combinations thereof.

* * * * *